July 4, 1967  L. L. FERRELL  3,329,137
SMOG CONTROL APPARATUS FOR INTERNAL COMBUSTION ENGINES
Filed June 1, 1965  2 Sheets-Sheet 2

INVENTOR.
LESLIE L. FERRELL
BY
Willard S. Broene
ATTORNEY

3,329,137
SMOG CONTROL APPARATUS FOR INTERNAL COMBUSTION ENGINES
Leslie L. Ferrell, 1452 E. Flower St.,
Phoenix, Ariz. 85014
Filed June 1, 1965, Ser. No. 460,308
5 Claims. (Cl. 123—119)

ABSTRACT OF THE DISCLOSURE

An air pollution control system for an internal combustion engine, wherein blow-by gases in the valve covers are directed through a filter and a portion thereof directed to a carburetor via a mixer, the remainder being combined with blow-by gases in the crankcase and then directed to the inlet manifold.

---

This invention pertains to improvements in a smog control apparatus for internal combustion engines.

One of the objects of this invention is to control the discharge of pollutants into the atmosphere originating in the valve cover compartments and crankcase of internal combustion engines.

Still another object is to provide an improved ventilating and air conditioning apparatus for the valve cover chambers and crankcase of an internal combustion engine.

It is a further object to provide a smog control apparatus for an internal combustion engine with effects a smoother and more efficient operating engine.

Another object is to provide a smog control device for an internal combustion engine which removes condensation and residue from the valve chamber and crankcase chambers of an internal combustion engine.

A further object is to provide clean air ventilation and purging of the valve and crankcase chambers of an internal combustion engine while thereby reducing heat in the engine.

And it is an object of this invention to create a turbulence within a mixing chamber and vacuum residue chambers remote from the engine wherein fumes from the engine are mixed within said chambers by suction from the engine valve and crankcase chamber areas and mixed with clean filtered air.

Further features and advantages of this invention will appear from a detailed description of the drawings in which.

Figure 1:
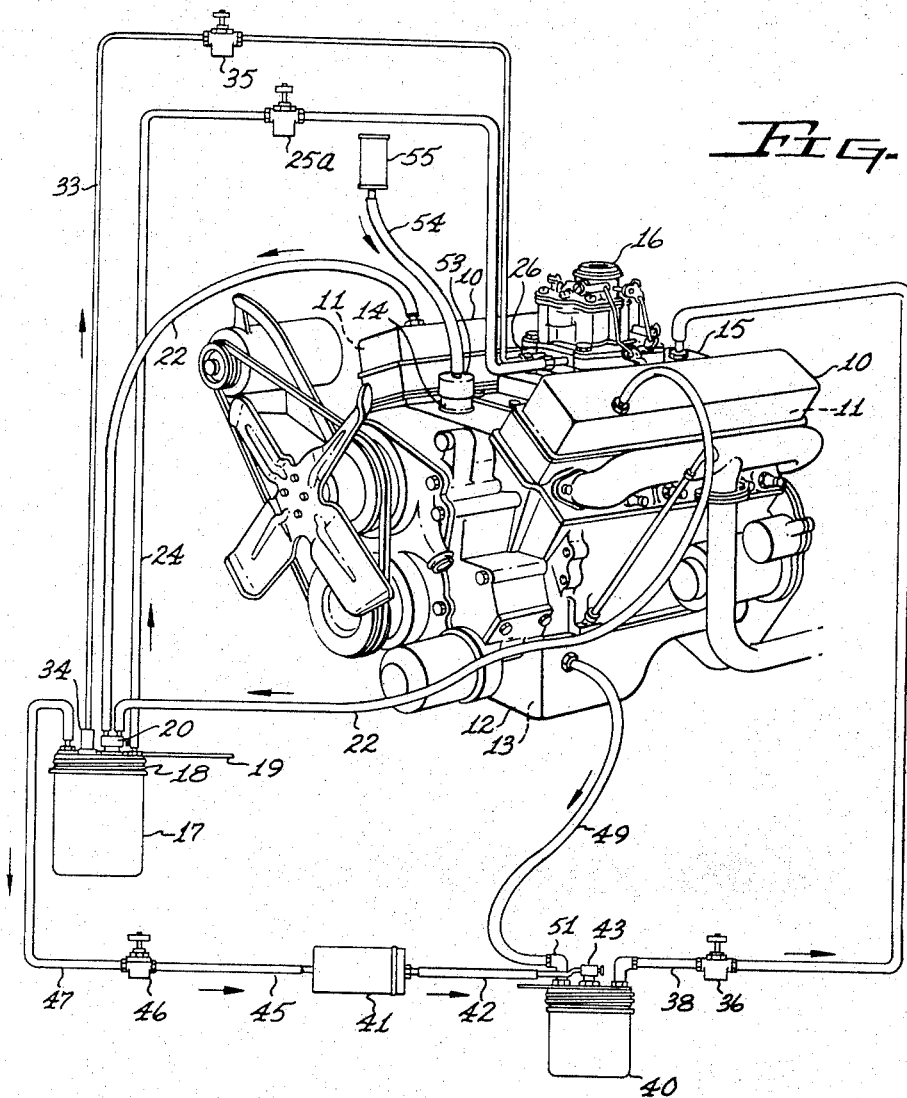
FIG. 1 is a circuit diagram showing the arrangement of the essential elements of this invention.
Figure 2:
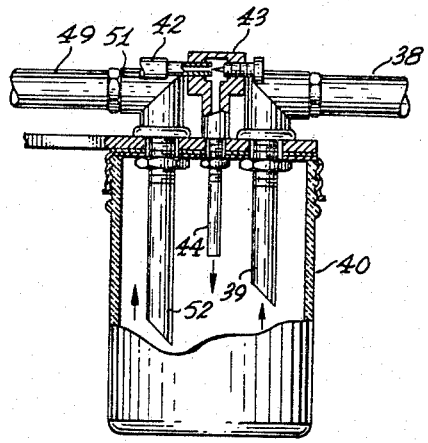
FIG. 2 is an enlarged view of the residue bottle element of the apparatus of this invention.
Figure 3:
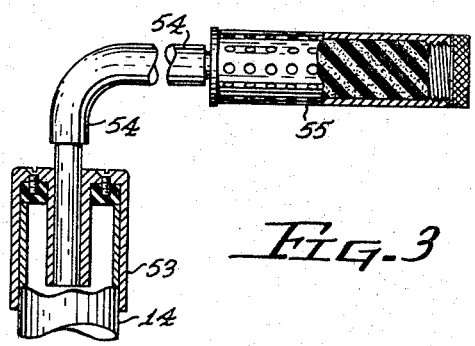
FIG. 3 is an enlarged view of the oil filler cap filter apparatus.
Figure 4:
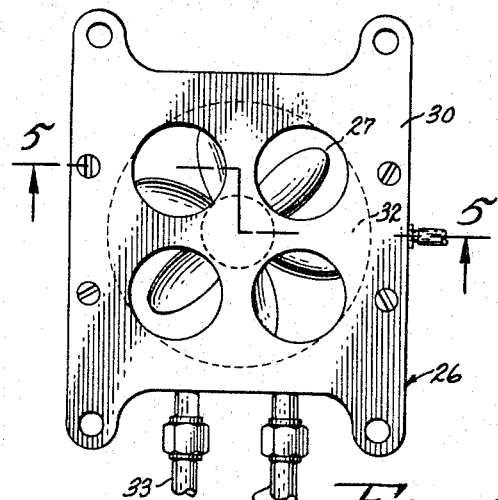
FIG. 4 is a plan view of the mixing chamber element of the apparatus.
Figure 6:
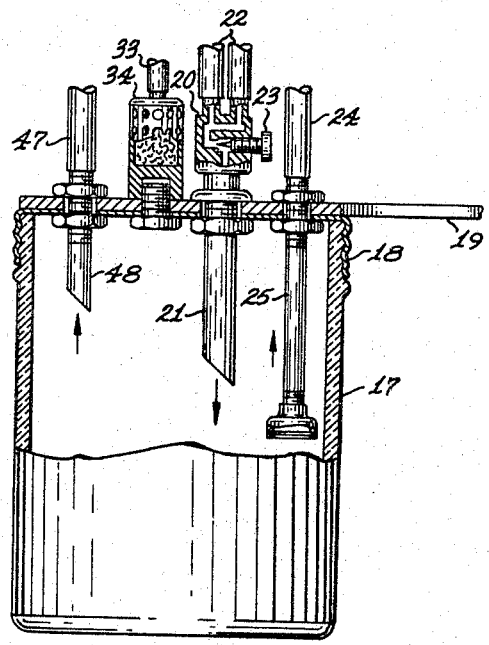
FIG. 6 is an enlarged view of the filter bottle element of the apparatus of this invention.
Figure 5:
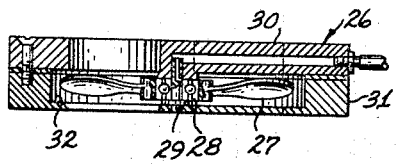
FIG. 5 is a sectional view on the line 5—5 of FIG. 4.

As an example of one embodiment of this invention, there is shown a smog control apparatus for an internal combustion engine having valve covers 10 enclosing valve chambers 11, a crankcase cover 12 enclosing the crankcase chamber 13 and having the oil filler pipe 14; the intake manifold 15; and a carburetor 16. A vacuum filter receptacle or bottle 17 has a cover 18 suitably fixed to the engine by a bracket 19 having an intake fitting 20 with a discharge pipe 21 within the bottle 17. Lines 22, one each connected to the valve covers 10 are connected to the fitting 20 having a control valve 23 adapted to be adjusted to regulate the inflow from the valve chambers 11 to the bottle 17.

A suction line 24 is connected to the suction tube 25 supported within the vacuum filter bottle 17 on the cover 18 is connected through a control valve 25a to a mixing chamber 26 mounted between the carburetor 16 and the intake manifold 15. The mixing chamber operates with a downdraft impeller wheel 27 mounted on a suitable ball bearing 28 carried on a shaft 29 in the spacer plate 30 and impeller housing 31 of the mixing chamber unit 26. The mixing chamber cavity 32 creates a venturi effect so as to restrict the fuel gases from the carburetor within the unit 26 and remixes clean air with fumes siphoned from within the valve covers 10 of the engine.

Metering shut-off valves 35 and 36 govern the amount of fresh air allowed within the mixing chamber 26 to reburn fumes from the valve cover chambers 11. Two air lines are used. One line 33 is for filtered fresh air direct from special small filter 34 through valve 35 to the mixing chamber 26.

The vacuum control valve 36 is connected to the intake manifold 15 by the line 37 which in turn is connected by a line 38 of the output pipe 39 of the residue container or bottle 40 so as to control the amount of vacuum or suction required to draw fresh air into the residue bottle 40 from a filter 41 through line 42 of the fresh air metering valve 43 and its input tube 44 and also siphon fumes and residue from the valve cover compartments 11, resulting in a smoother operating and more efficient engine. Condensation and residue remain in the bottle and are not siphoned back into the engine. The air filter 41 is connected by a line 45 through a control valve 46 and line 47 to a suction tube 48 of the vacuum filter bottle. A line 49 is connected into the crankcase chamber 13 and to the input fitting 51 and tube 52 in the residue bottle 40.

The engine oil filler pipe 14 closed off by a tight fitting coupling 53 to which is connected a line 54 having a suitable filter 55 open to atmosphere so as to allow a free flow of clean air into the crankcase and siphoned through the crankcase back through the filter residue bottle 40 which is replenished with clean fresh air before fumes are returned to the engine manifold. This free flow of fresh air from filter 55 and filler cap coupling 53 through the crankcase 12 reduces heat in the engine. Turbulence is created within the mixing chamber 26 and both bottles or receptacles 17 and 40 so that the fumes from the engine are mixed within said chamber and bottles by suction from the engine and mixed with clean filtered air.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A smog control apparatus for an internal combustion engine comprising in combination:
   (A) a valve chamber,
   (B) a crankcase chamber,
   (C) an oil filler pipe connected to said chambers,
   (D) an intake manifold,
   (E) a carburetor,
   (F) a vacuum filter receptacle,
   (G) a mixing chamber located between and connecting said carburetor to said manifold,
   (H) a line interconnecting said vacuum filter receptacle to said mixing chamber.
   (I) a line interconnecting said vacuum filter receptacle to said valve chamber, (J) and means in said mixing chamber to restrict the fuel gases from said carburetor within said mixing chamber and remix clean air with fumes siphoned from within said valve chamber, (K) and a further discharge line from said vacuum filter receptacle connected to said crankcase chamber and said intake manifold.

2. A smog control apparatus for an internal combustion engine comprising in combination:
(A) a valve chamber,
(B) a crankcase chamber,
(C) an oil filler pipe connected to said chambers,
(D) an intake manifold,
(E) a carburetor,
(F) a vacuum filter receptacle,
(G) a mixing chamber located between and connecting said carburetor and said manifold,
(H) a line interconnected between said vacuum filter and said mixing chamber,
(I) a line interconnected between said vacuum filter receptacle and said valve chamber,
(J) means in said mixing chamber to restrict the fuel gases from said carburetor within said mixing chamber and remix clean air with fumes siphoned from within said valve chamber.
(K) and a control valve for adjusting the flow in said line between said vacuum filter receptacle and said mixing chamber,
(L) and a further discharge line from said vacuum filter receptacle connected to said crankcase chamber and said intake manifold.

3. A smog control apparatus for an internal combustion engine comprising in combination:
(A) a valve chamber,
(B) a crankcase chamber,
(C) an oil filler pipe including an air inlet closure cap, connected to said valve and crankcase chambers,
(D) an intake manifold,
(E) a carburetor,
(F) a vacuum filter receptacle,
(G) a mixing chamber located between and connecting said carburetor to said manifold,
(H) a discharge line interconnecting said vacuum filter receptacle to said mixing chamber,
(I) an input interconnecting said vacuum filter receptacle to said valve chamber,
(J) means in said mixing chamber to restrict the fuel gases from said carburetor within said mixing chamber and remix clean air with fumes siphoned from within said valve chamber,
(K) a fresh air intake line connected into said mixing chamber,
(L) and a further discharge line from said vacuum filter receptacle connected to said crankcase chamber and said intake manifold.

4. A smog control apparatus for an internal combustion engine comprising in combination:
(A) a valve chamber,
(B) a crankcase chamber,
(C) an oil filler pipe, including an air inlet closure cap, connected to said valve and crankcase chambers,
(D) an intake manifold,
(E) a carburetor,
(F) a vacuum filter receptacle,
(G) a mixing chamber located between and connecting said carburetor to said manifold,
(H) a line connecting said vacuum filter receptacle to said mixing chamber,
(I) a line interconnecting said vacuum filter receptacle to said valve chamber,
(J) means in said mixing chamber to restrict the fuel gases from said carburetor within said mixing chamber and remix clean air with fumes siphoned from within said valve chamber,
(K) and a line interconnected between said intake manifold and both said crankcase chamber and vacuum filter receptacle so that fumes from said crankcase chamber and said valve chamber are mixed within said mixing chamber and said vacuum filter receptacle by suction from the engine intake manifold and mixed with clean air entering said oil filler pipe.

5. A smog control apparatus for an internal combustion engine comprising in combination:
(A) a valve chamber,
(B) a crankcase chamber,
(C) an oil filler pipe connected to said valve and mixing chambers,
(D) an intake manifold,
(E) a carburetor,
(F) a vacuum filter receptacle,
(G) a mixing chamber located between and connecting said carburetor to said manifold,
(H) a line interconnecting said vacuum filter receptacle to said mixing chamber,
(I) a line interconnecting said vacuum filter receptacle to said valve chamber,
(J) means in said mixing chamber to restrict the fuel gases from said carburetor within said mixing chamber and remix clean air with fumes siphoned from within said valve chamber,
(K) a line interconnected between said intake manifold and both said crankcase chamber and said vacuum filter receptacle, so that fumes from said valve chamber are mixed within said mixing chamber and said vacuum filter receptacle by suction from the engine intake manifold and mixed with clean filtered air,
(L) said last mentioned line including a residue receptacle connected in said line from said vacuum filter receptacle and crankcase chamber, to said intake manifold,
(M) and means including an air metering valve and a filter serially interconnected between said residue receptacle and said vacuum filter receptacle.

References Cited

UNITED STATES PATENTS

| | | | |
|---|---|---|---|
| 1,353,454 | 9/1920 | Cochran | 123—119 |
| 2,083,983 | 6/1937 | Brenner | 123—119 |
| 2,731,958 | 1/1956 | Robler | 123—119 |
| 3,059,628 | 10/1962 | Linn | 123—119 |
| 3,073,293 | 1/1963 | Barker | 123—119 |
| 3,091,229 | 5/1963 | Nevin | 123—119 |
| 3,259,117 | 7/1966 | Ritchie | 123—119 |

MARK NEWMAN, *Primary Examiner.*

AL LAWRENCE SMITH, *Examiner.*